G. S. SNELL.
BRUSH.

No. 191,259.  Patented May 29, 1877.

ATTEST.
Charles Pickles
Paul Bakewell

INVENTOR.
George S. Snell.
by Chas. D. Moody,
his atty.

UNITED STATES PATENT OFFICE.

GEORGE S. SNELL, OF ST. LOUIS, MISSOURI.

IMPROVEMENT IN BRUSHES.

Specification forming part of Letters Patent No. 191,259, dated May 29, 1877; application filed April 20, 1877.

*To all whom it may concern:*

Be it known that I, GEORGE S. SNELL, a resident of St. Louis, Missouri, have made a new and useful Improvement in Tooth-Brushes, of which the following is a full, clear, and exact description, reference being had to the annexed drawing, making a part of this specification, in which—

Figure 1:
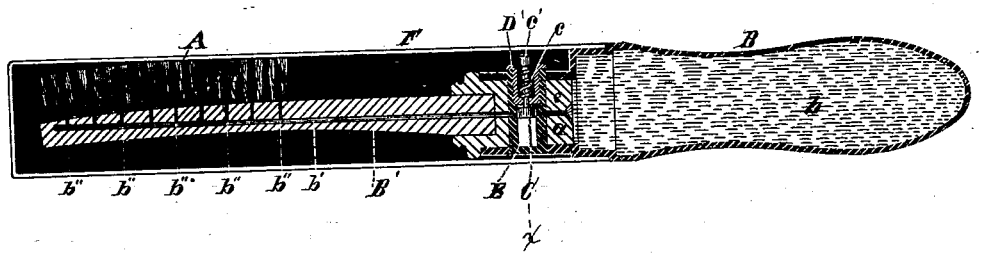
Figure 2:
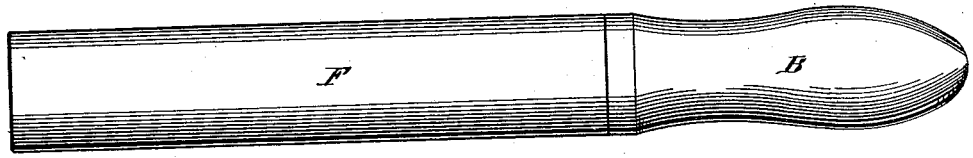
Figure 3:

Figure 1 is a longitudinal section of the invention, showing the casing attached; Fig. 2, a side elevation; and Fig. 3, a cross-section taken on the line $x\ x$ of Fig. 1, but showing the plug in elevation.

Similar letters refer to similar parts.

The present invention, considered generally, consists of a tooth-brush having a hollow handle, that serves as a reservoir to contain a tooth-wash, which, as it is needed, is allowed to flow from the reservoir through the shank of the handle to the brush.

Referring to the annexed drawing, A represents the brush proper, and B its handle. In the latter is a chamber, $b$. A narrow passage, $b'$, extends longitudinally through the shank B' of the handle to beneath the brush, whence it branches into several sub-passages, $b''\ b''\ b''$, that lead to the surface of the handle within the brush, as shown. This establishes a communication between the interior of the handle B and the brush A, saving as is hereinafter set forth.

The shank B' is made separate from the handle proper, B, and so as to fit like a stopper into the open end of the latter. The end $a$ of the shank is preferably enlarged. This last-named part $a$ may be made in one piece with the shank or separate therefrom, as shown.

The tooth-wash is introduced into the chamber $b$, and the shank B' is inserted in the handle B. The wash would now flow, through the passages $b'$ and $b''\ b''\ b''$, to the brush A were it not for a valve, C, that is arranged to close the passage $b'$. A spring, $c$, encircling the valve-stem $c'$, serves to keep the valve in this position, saving when the stem, which projects above the surface of the handle, is depressed. When this is done the valve moves past the line of the passage $b'$, and the wash flows to the brush.

Instead of working the valve directly in the part $a$, I preferably employ the following construction: The valve is arranged to seat upward against a seat, D, through which the stem $c'$ projects, that screws into a hollow cylindrical plug, E, that, in turn, is made to pass transversely through the handle B and part $a$ of the shank, and that is perforated in the line of the passage $b'$, as shown at $e\ e$. Thus made, the plug serves to fasten the shank B' and handle B together. The chamber within the plug is large enough for the valve to move past the openings $e\ e$.

In use, the operator depresses the valve until a sufficient portion of the wash has passed to the brush, when the valve is allowed to close by the action of the spring $c$.

As some tooth-washes are liable to gum, and thereby close the passages $b'$ and $b''\ b''\ b''$, I preferably employ a casing, F, that is made to pass over the brush and to slip onto the handle B, as shown. This serves to keep the air from the brush, and also to keep it cleaner.

I claim—

1. The herein-described tooth-brush, consisting of the brush A, handle B, having the chamber $b$, and the shank B', having the passage $b'$ and $b''\ b''\ b''$, substantially as described.

2. The combination of the brush A, hollow handle B, perforated shank B', and valve C, substantially as described.

3. The perforated shank B', perforated plug E, valve C, and seat D, combined substantially as described.

GEO. S. SNELL.

Witnesses:
 CHAS. D. MOODY,
 PAUL BAKEWELL.